(12) United States Patent
Calleja et al.

(10) Patent No.: US 9,103,936 B2
(45) Date of Patent: Aug. 11, 2015

(54) METHOD AND APPARATUS FOR DETERMINING AND DISPLAYING GEOSTEERING INFORMATION

(75) Inventors: Bronwyn Michelle Calleja, Kalimantan (ID); Barry McKay, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 1129 days.

(21) Appl. No.: 13/010,502

(22) Filed: Jan. 20, 2011

(65) Prior Publication Data

US 2012/0188091 A1 Jul. 26, 2012

(51) Int. Cl.
*G01V 3/00* (2006.01)
*G01V 3/38* (2006.01)
*G01V 1/40* (2006.01)
*E21B 7/04* (2006.01)

(52) U.S. Cl.
CPC ... *G01V 3/38* (2013.01); *E21B 7/04* (2013.01); *G01V 1/40* (2013.01)

(58) Field of Classification Search
CPC ..................................................... G01V 1/40
USPC .............. 340/854.1; 175/61, 0.62; 166/255.1, 166/244.1
See application file for complete search history.

(56) References Cited

U.S. PATENT DOCUMENTS

| | | | |
|---|---|---|---|
| 5,812,493 A | 9/1998 | Robein et al. | |
| 6,370,491 B1 | 4/2002 | Malthe-Sorenssen et al. | |
| 6,654,691 B2 | 11/2003 | Metrick | |
| 7,302,373 B2 | 11/2007 | Fleury et al. | |
| 7,337,067 B2 | 2/2008 | Sanstom | |
| 7,382,135 B2 | 6/2008 | Li et al. | |
| 7,596,481 B2 | 9/2009 | Zamora et al. | |
| 7,630,872 B2 | 12/2009 | Xia et al. | |
| 2002/0103630 A1* | 8/2002 | Aldred et al. | 703/10 |
| 2010/0122847 A1* | 5/2010 | Xia et al. | 175/41 |

OTHER PUBLICATIONS

"Geosteering with InSite ADRtm Sensor and StrataSteer(r) 3D Service", (c) 2008 Halliburton, (2008), 2 pgs.

(Continued)

*Primary Examiner* — Hai Phan
*Assistant Examiner* — Zhen Y Wu
(74) *Attorney, Agent, or Firm* — Schwegman Lundberg & Woessner, P.A.; John W. Wustenberg

(57) ABSTRACT

A method and system to render a graphic display that includes a color-coded risk indicator to facilitate the steering of a drill string during subterranean drilling. The system comprises a receiver to receive measurement data from downhole instrumentation forming part of the drill string during the drilling of a well bore in a geological formation, and an exit risk determining module to determine an exit risk value based at least in part on the measurement data. The exit risk value is indicative of a risk of exiting of the formation by the drill string. A display module is provided to render the graphic display of decision information, to assist steering of the drill string. The color-coded exit risk indicator comprises a colored area having a color indicative of the exit risk value, the color of the colored area being changeable in response to changes in the exit risk value. The graphic display may show a wellbore trajectory in relation to a formation boundary, with the color-coded risk indicator comprising an area extending between the wellbore trajectory and the formation boundary.

26 Claims, 6 Drawing Sheets

(56) References Cited

OTHER PUBLICATIONS

"Sperry-Sun StrataSteer(r) 3D Service, A Fully Integrated Service for Optimizing for Well Trajectory in Real Time", (c) 2003 Halliburton, (2003), 2 pgs.

Long, Adam, "Increasing Hydrocarbon Productivity by Optimizing Reservoir Wellbore Placement", (c) 2010 Halliburton, (Mar. 2006), 1 pg.

* cited by examiner

METHOD AND APPARATUS FOR DETERMINING AND DISPLAYING GEOSTEERING INFORMATION

TECHNICAL FIELD

The present application relates generally to methods and apparatus for determining information useful to steering of well drilling operations, and for displaying that information for use; and more particularly relates to systems and methods wherein such geosteering information can be determined based at least in part on well logging measurements, and can be displayed in essentially real-time during the drilling operations.

BACKGROUND

Well bores drilled through geological formations, such as reservoirs, to access hydrocarbons are often drilled along a path that extends through a formation, rather than merely passing through it in a vertical direction. One example of such wells are those having a substantially horizontal trajectory through the formation of interest, which may be used, for example, to increase the drainage area in the reservoir. Because such reservoirs are typically located in layered earth formations, the position of such well bores with respect to boundaries of the formation layers defining the reservoir or other zone of interest can be of critical importance to the productivity, and thus value, of the well. In many example situations, the well path will preferably be steered to remain within the formation layer or region of interest for an extended distance, and to change direction as needed to maintain that placement. Thus, visualization tools that can provide information to assist in evaluating drilling of a desired path would be very desireable.

BRIEF DESCRIPTION OF THE DRAWINGS

Some embodiments are illustrated by way of example and not limitation in the figures of the accompanying drawings in which.

DETAILED DESCRIPTION

The following detailed description refers to the accompanying drawings that depict various details of examples selected to show how the present invention may be practiced. The discussion addresses various examples of the inventive subject matter at least partially in reference to these drawings, and describes the depicted embodiments in sufficient detail to enable those skilled in the art to practice the invention. Many other embodiments may be utilized for practicing the inventive subject matter other than the illustrative examples discussed herein, and structural and operational changes in addition to the alternatives specifically discussed herein may be made without departing from the scope of the inventive subject matter.

In this description, references to "one embodiment" or "an embodiment," or to "one example" or "an example" in this description are not intended necessarily to refer to the same embodiment or example; however, neither are such embodiments mutually exclusive, unless so stated or as will be readily apparent to those of ordinary skill in the art having the benefit of this disclosure. Thus, a variety of combinations and/or integrations of the embodiments and examples described herein may be included, as well as further embodiments and examples as defined within the scope of all claims based on this disclosure, as well as all legal equivalents of such claims.

For the purposes of this specification, a "processor-based system" or "processing system" includes a system using one or more processors, microcontrollers and/or digital signal processors or other devices having the capability of running a "program," (all such devices being referred to herein as a "processor"). A "program" is any set of executable machine code instructions, and as used herein, includes user-level applications as well as system-directed applications or daemons.

Figure 1:
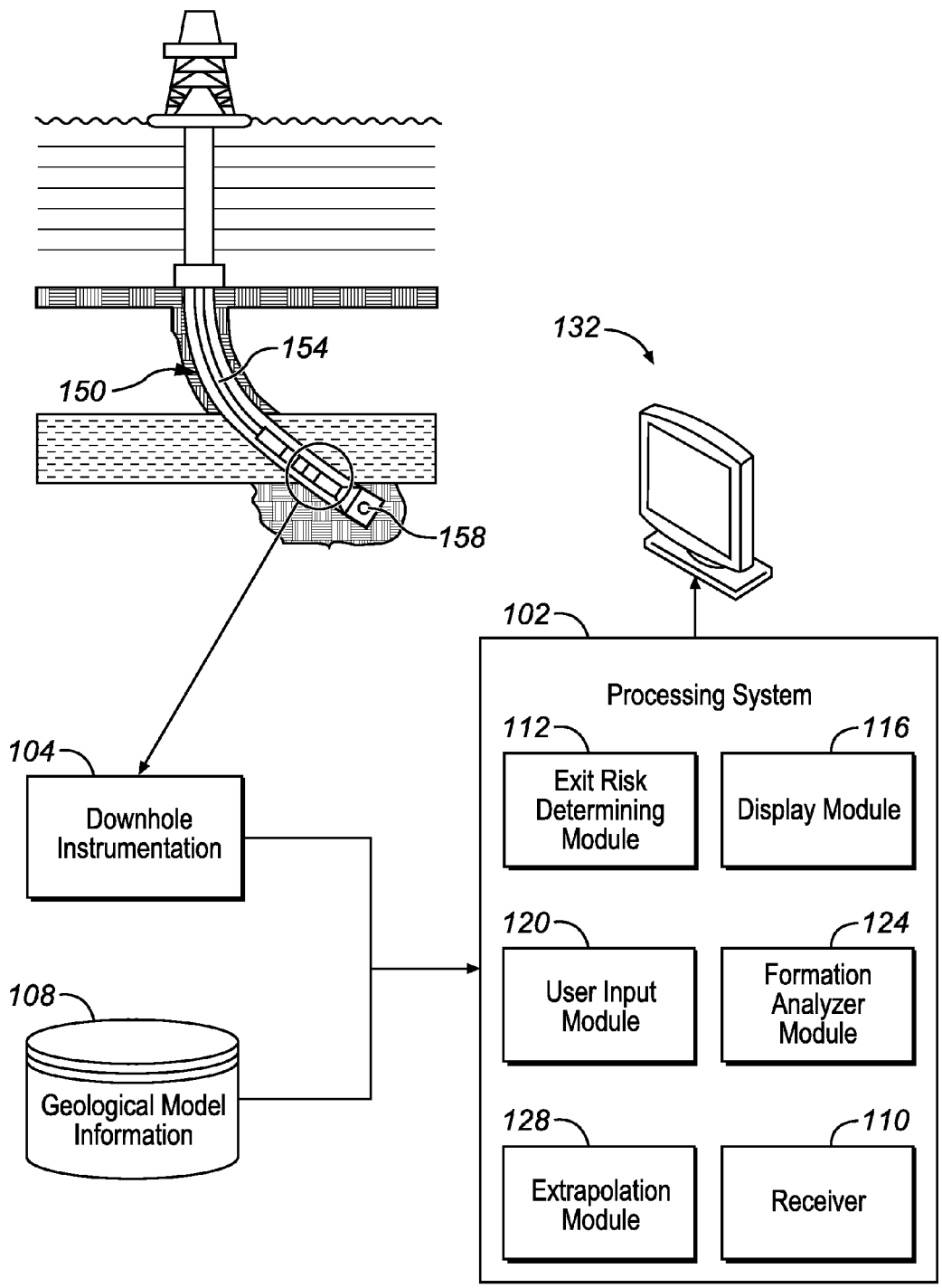
FIG. 1 depicts a schematic diagram of a system to assist user-operated steering of a drill string during the drilling of a well bore in a geological formation, in accordance with an example embodiment.

FIG. 1 is a schematic block diagram depicting one example of a measurement and control system 100 for facilitating steering of a drill string 154 during the drilling of a subterranean well bore 150. The drill string 154 is provided in a conventional fashion, and contain downhole instrumentation 104 to take real-time measurements during the drilling operation. The downhole instrumentation 104 may comprise, for example, azimuthal resistivity tools that use electromagnetic measurement signals to measure resistivity of geological formations through which the well bore 150 is being drilled. The downhole instrumentation 104 may further provide positional and/or directional information of a drill bit 158 (or a component near the drill bit) at a leading end of the drill string 154, for example providing a measured depth value, an inclination value, and an azimuth value with respect to a fixed point, such as a spud point of the well bore 150.

The measurement and control system 100 includes a processing system 102 to receive measurement data from the downhole instrumentation 104, to process the measurement data, and to render a graphical display on a display device 132, so as to provide real-time decision information to members of a team responsible for steering the drill string 154. Measurement and control system 100 is depicted in block diagram form; and it should be clearly understood that in some examples, the components of system 100 may all be present at, or in the vicinity of the well bore. However, in other operations, some of the components may be located remotely, and may communicate through a LAN, WAN or across the internet. Additionally, there may be additional components present, such as, for example, additional display devices, for observation of the drilling operation and the geosteering data provided as described herein.

The system 102 includes a receiver 110 in communication with the downhole instrumentation 104, to receive the measurement data in or near real-time, and to communicate it to processing system 102 (or component(s) thereof) as needed to perform the example operations as described herein. System 102 also comprises an exit risk determining module 112.

In the present description, for clarity of describing mechanisms providing pertinent functionality, the mechanisms will be described in terms of various "modules." These modules may be implemented is software, firmware or hardware; but the description of different modules does not mean or in any way suggest that the mechanisms that provide the described functionality are separate from one another in any way. For example, the various "modules" might all be implemented in software, through executable instructions stored in a single machine-readable mechanism, with no separation whatsoever as to the functionality provided by the separate instructions, Exit risk determining module 112 will, in many examples, determine an exit risk value based at least in part on the measurement data obtained during the drilling operation. In some examples, the exit risk value will be a quantitative indication of the risk of exiting a particular geological formation in which the drill string 154, and in particular the drill bit 158, is currently located. This indication of risk can be determined in any of a number of different ways, and with consideration of various variable, as will be addressed in more detail later herein. The geological formation may typically be a layered formation, being located between two generally vertically spaced formation boundaries (shown schematically in FIG. 4A-4B). In such instances, the object of steering may be to steer the drill string 154 more or less horizontally along the formation of interest, without exiting the formation by intercepting either of the boundaries. A single exit risk value therefore pertains to the risk of exiting the formation of interest through one of the boundaries. The exit risk determining module 112 may simultaneously but independently determine or calculate respective exit risk values for each of the generally vertically offset boundaries, as well as for any other identifiable boundaries that may be present. Various example methods of calculating exit risk values are described below with reference to FIG. 2. The determining or calculation of exit risk values by the exit risk determining module 112 may be performed based not only on the measurement data, but also on geological model information 108 stored on one or more databases or memories that are operatively connected to the processing system 102. The geological model information 108 may typically comprise geological information gathered in earlier geological explorations and/or surveys with respect to the relevant geological formation(s) and may include, for example, well logging measurements in close by ("offset") well bores.

A formation analyzer module 124 is provided to determine at least one formation property value with respect to a physical property of the formation, such as rock porosity, based on measurement data received from the downhole instrumentation 104. In some examples, the processing system 102 further includes an extrapolation module 128 to extrapolate a current trajectory of the well bore 150 beyond the current position of the leading end of the drill string 154, in order to enable some forms of exit risk calculation by the exit risk determining module 112 with respect to projected points along the well bore trajectory beyond the present location of the drill bit 158. To this end, the exit risk determining module 112 may calculate or estimate the positions and/or shapes of the relevant reservoir boundaries not only for points in vertical alignment with the drill bit 158, but may also perform boundary position/shape estimation projected ahead of the drill bit 158.

The system 102 further includes a display module 116 to render on the display device 132 a graphic display or graphic user interface (GUI) showing decision information to assist a user in steering of the drill string 154. Example graphic displays are discussed in greater detail below with reference to FIGS. 4A and 4B. In some examples, the graphic display will include a color-coded indicator of a variable of the drilling operation, the variable determined at least in part from information from the downhole instrumentation. In many preferred examples, the color coded indicator will be a color coded exit risk indicator in the form of at least one colored area that has a color indicating or representing at least a current exit risk value. This exit risk value can be as simple as either a linear or vertical distance to the bed boundary, or may be based on more complex evaluations, such as the trajectory of the well bore relative an expected contour of a bed boundary. In a particular example, the graphic display may include separate color coded exit risk indicators with respect to each of a pair of formation boundaries between which of the drill bit 158 is located. The exit risk factors will, in some examples, be calculated differently relative to different bed boundaries. For example, where a well bore has a generally downwardly-extending path (as depicted at the left side of FIG. 4A), the exit risk to the upper bed boundary might be expressed as a function of vertical distance to the boundary, since the risk of exit is low in view of the well bore path; but an exist risk determination as to the lower bed boundary that takes into account the path of the well bore may be much more appropriate. The graphic display may further include a color-coded formation property indicator to indicate at least one formation property value as calculated by the formation analyzer module 124.

The processing system 102 also includes a user input module 120 to receive user input with respect to various aspects of the graphic display, to enable a user to customize the display. A user may, in particular, provide settings for the color-coded exit risk indicator according to personal preferences or specific requirements. The user input module 120 may thus, for example, display a GUI element, such as a group of text boxes or selection buttons, to permit user-specification of exit risk value ranges and associated colors for the respective ranges. The user may in similar fashion select a particular formation property to be indicated by the color-coded formation property indicator, and may additionally specify or define ranges and associated colors for the relevant formation property value.

Figure 2:
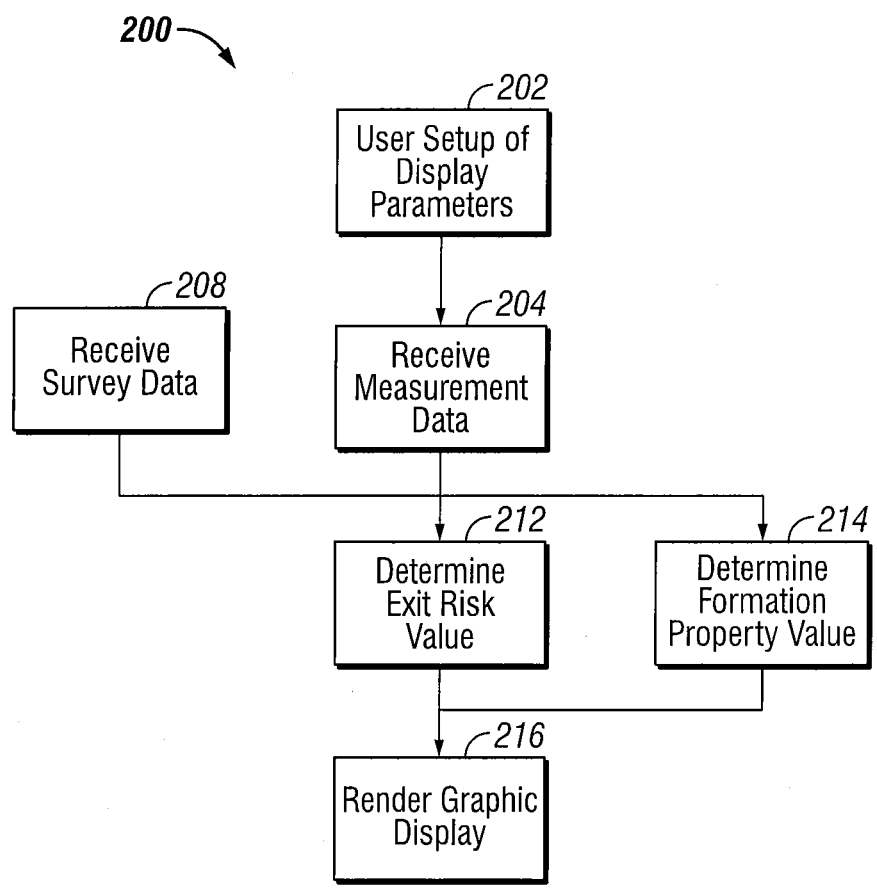
FIG. 2 depicts a flow chart showing an example method of operation of a system such as that depicted in FIG. 1
Figure 3:
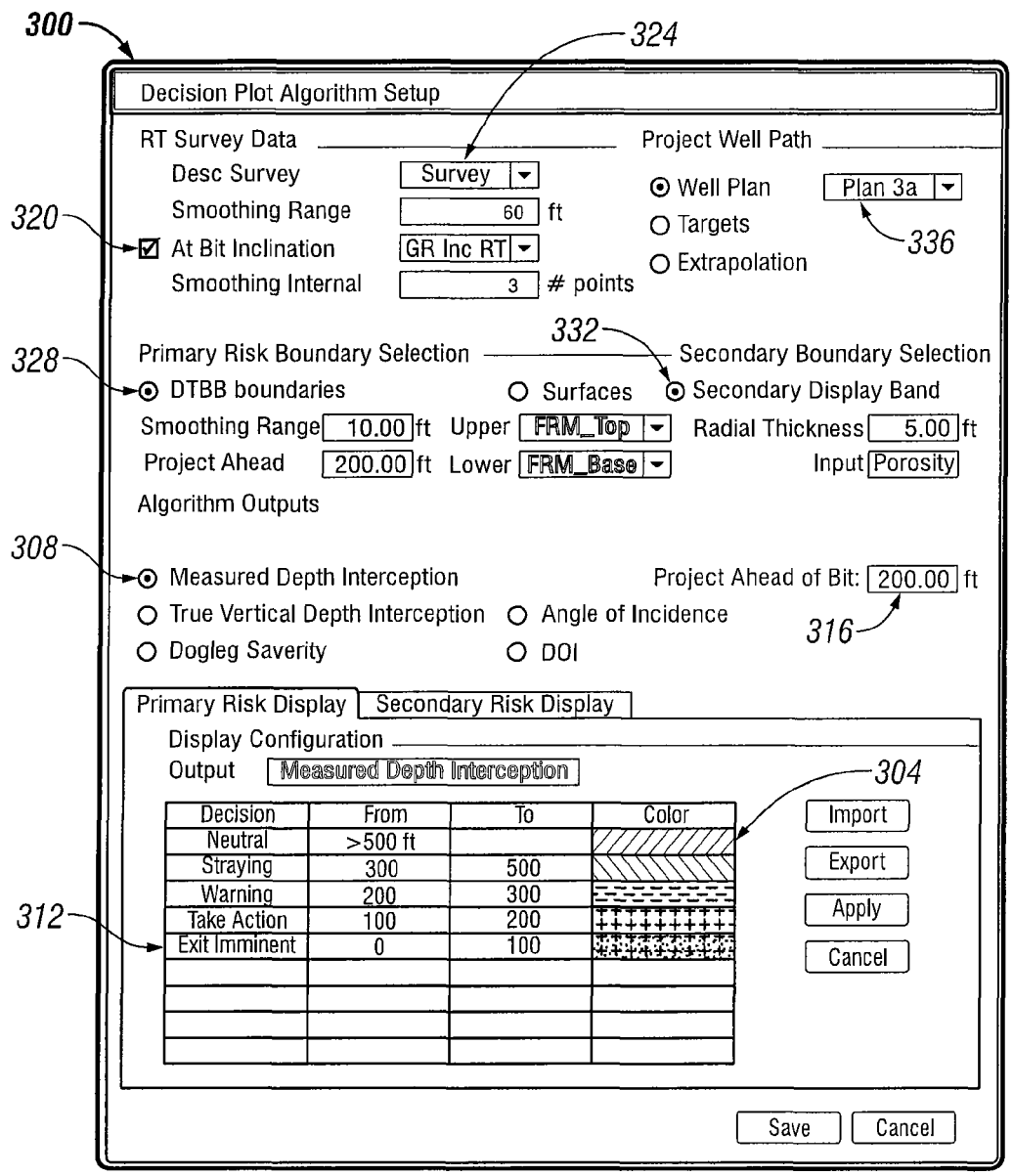
FIG. 3 depicts an example graphical user interface (GUI) to enable a user to select or set exit range values and corresponding colors for a color coded exit risk indicator in a graphic display of geosteering decision information.

FIG. 2 depicts a flowchart 200 identifying an example method of displaying decision information during drilling operations, the method being performed by a system such as the processing system 102 of FIG. 1. The example method 200 includes the initial operation of user setup of display parameters, at 202. Such user setup may comprise displaying on the display device 132 a GUI through which user input may be received. An example GUI 300 is shown in FIG. 3. The GUI 300 includes an editable table 304 by which a user may specify or edit exit risk value ranges and may select or edit colors corresponding to the respective exit ranges. An exit risk indicator forming part of the graphic display (see FIGS. 4A-4B) will therefore have a color which corresponds to a particular range within which a current exit risk value falls, as determined by the exit risk determining module 112.

The GUI 300 may further include a series of selection buttons 308 to select a particular measure of exit risk value which is to be calculated by the exit risk determining module 112 and represented by the color-coded exit risk indicator in the graphic display. As noted above, a quantitative indication of the risk of exiting a formation may be calculated in a variety of ways. For example, a value indicating the further distance to be traveled by the drill string 154 along its current course before it is projected to intercept a formation boundary provides one measure of the exit risk. Such a value is referred to herein as "measured depth interception." For example, a vertical distance to formation boundary inversion and edited geological surfaces may provide a dip and azimuth for the boundaries, as well as the distance from the wellbore which can be used within an algorithm to provide a trend of the geology ahead of the drill bit 158. Combining the geological projection with an extrapolation of a well bore trajectory or well plan, estimates can be made of interception with a particular boundary in terms of measured depth. The vertical distance to a boundary may typically be calculated based on resistivity measurements, but other measurements may be used. Instead of performing an inversion calculation on real-time azimuthal data, other embodiments may include making manual correlations between real-time well log data and a geological model based on offset well log data with respect to surfaces for each formation. Calculation of the actual welt path position in three-dimensional space may be based, for example, on a measured depth value, a true vertical depth value, and inclination value, and an azimuth value. These values can originate from survey measurements (typically taken at a measured depth behind the drill bit 158) or from the inclination measurements recorded in real-time.

A different measure of exit risk may be provided by calculating proximity of the drill bit 158 to the relevant formation boundary or reservoir boundaries. In this context, "proximity" may mean the shortest distance between the drill bit 158 and the associated formation boundary. A variation of such a proximity value is a calculation of vertical spacing between the formation boundary and the drill bit 158, referred to herein as "true vertical depth interception." A further measurement variable of exit risk may be an angle of incidence between the drill string 154 and a relevant reservoir boundary. Bearing in mind that a reservoir boundary is a transition interface between two layered formations, the reservoir boundary will have a particular slope or orientation at a particular point. Such a slope or orientation may be referred to as the "dip" of the boundary. An angle of incidence between the drill bit 158 and the boundary corresponds to a rate of convergence between the drill string 154 and the boundary, and the particular value of the angle of incidence therefore provides a quantitative indication of the risk of exiting the relevant formation or reservoir. Yet a further measure or value which may provide an indication of the exit risk is the dogleg severity of the well bore 150 as it is being drilled. Dogleg severity is usually kept below certain limits in order to increase the success of running completions, whilst using relatively high dogleg severity to remain within a formation can increase exit risks depending on the rotary steerable type and formation properties. This is especially true for well planning ahead of the drill bit 158. The exit risk value calculated by the exit risk determining module 112 may include calculation of any one of, or any combination of, the above-discussed values or measures, or any other measure which provides an indication of the risk of exiting the formation. Calculated petrophysical derivatives from measured data made available from downhole instrumentation 104 such as water saturation, permeability and estimated hydrocarbon content can also be used to identify the target zone ideal parameters, and hence to estimate the exit risk.

In the example GUI 300 illustrated in FIG. 3, a user has selected, by way of the radio buttons 308, measured depth interception as the exit risk value type. As mentioned above, "measured depth" means a distance along the well bore between a wellhead and a particular point in the well bore. When the drill bit 158 is on course to intercept a particular reservoir boundary, the exit risk determining module 112 calculates a further distance to be travel along its current course before the drill bit 158 intercepts the reservoir boundary. The table 304 of FIG. 3 may thus indicate that, when the measured depth interception (i.e. the further distance to be traveled along the drill string's current course before intercepting a reservoir boundary) is greater than 500 feet, the color-coded exit risk indicator should be green. A particular color may be edited, for example by clicking on a particular colored cell in the table 304 to launch a color selection palette. Different colors are indicated by different hatching schemes in the FIGS. 3 and 4.

The table 304 may also include a decision prompt 312 associated with each exit range. The text of the respective decision prompts 312 may be displayed in real time as part of the graphic display, to assist decision-making with respect to steering of the drill bit 158. When, for example, the measured depth interception has a value lower than 100 feet, the text "Exit Imminent" may be displayed in addition to rendering the color-coded exit risk indicator the associated color, which in this example is red. Although not shown in FIG. 3, a user may optionally provide a text definition associated with each color or exit range. An example set of definitions is provided in Table 1.

| Color | Measured depth interception (feet) | Definition |
| --- | --- | --- |
| Green | >500 | Well away from a defined bed boundary, no imminent exit, drill ahead as planned. |
| Yellow | 300-500 | Beginning to get closer to bed boundary, monitor upcoming results, plan alternative targets for well path, drill ahead as planned. |
| Amber | 100-300 | Within range of a bed boundary, implement changes to the well path, monitor upcoming results. |
| Red | <100 | Exit imminent, make and implement alternative well plans. |

The GUI 300 further provides a series of text boxes and other GUI elements to receive user input with respect to various customizable aspects of the graphic display as well as input to the exit risk determining module 112. For example, a user may select outputs to the exit risk determining module 112 within selection box 308 and specify in text box 316 a particular value for a distance ahead of the drill bit 158 with respect to which exit risk values are to be calculated. A check box 320 may allow the user to select whether or not real-time at bit inclination survey data is to be used in calculating the exit risk values, and an associated drop down menu 324 may enable the user to select a particular survey data source. An additional selection can be made at 336 to select whether projection ahead of the drill bit 158 of a well trajectory 444 (FIG. 4) is based to be based on an existing well plan, on defined targets, or on simple extrapolation from the current well path. A selection as to the primary risk boundaries to be used in the display can be made for calculated distance to bed boundary inversion points, at 328. The secondary boundary selection can also be enabled at 332, and display properties can be edited accordingly.

The user setup of display parameters, at 202, may further include receiving user input with respect to a particular formation property or drilling property which is to be indicated in the graphic displayed by a formation property indicator. In an example embodiment, the user may thus select indication of a physical property such as the porosity of the reservoir. Similar to the selection of exit range values and associated colors, the user may specify particular range values and associated color palette for rock porosity. Examples of other formation property values which may be selected include, but are not restricted to: lithology, Vshale, Sw (water saturation), permeability and hydrocarbon content. Drilling parameters may also be used for this display include, but are not restricted to: rate of penetration (ROP), rotation (RPM), weight on bit (WOB), drilling vibration, equivalent circulating density (ECD), pore pressure, wellbore stability, wellbore proximity, torque and drag.

During the drilling of the well bore 150, the processing system 102 receives real-time measurement data, at 204 (FIG. 2), from the downhole instrumentation 104. The processing system 102 may simultaneously receive or retrieve geological model information 108, at 208. Thereafter, a current exit risk value is calculated, at 212, by the exit risk determining module 112, in accordance with the user-selected preferences or parameters. In instances where the user has selected indication of formation property values in addition to the exit risk value, the method 200 may include determining the relevant formation property value, at 214. Thereafter, the graphic display is rendered, at 216, on the display device 132. Example graphic displays or GUIs are described below with reference to FIGS. 4A and 4B. Operations 204 through 216 of the method 200 are performed continuously during the drilling operation, so that the graphic display is updated in or near real-time.

Figure 4A:
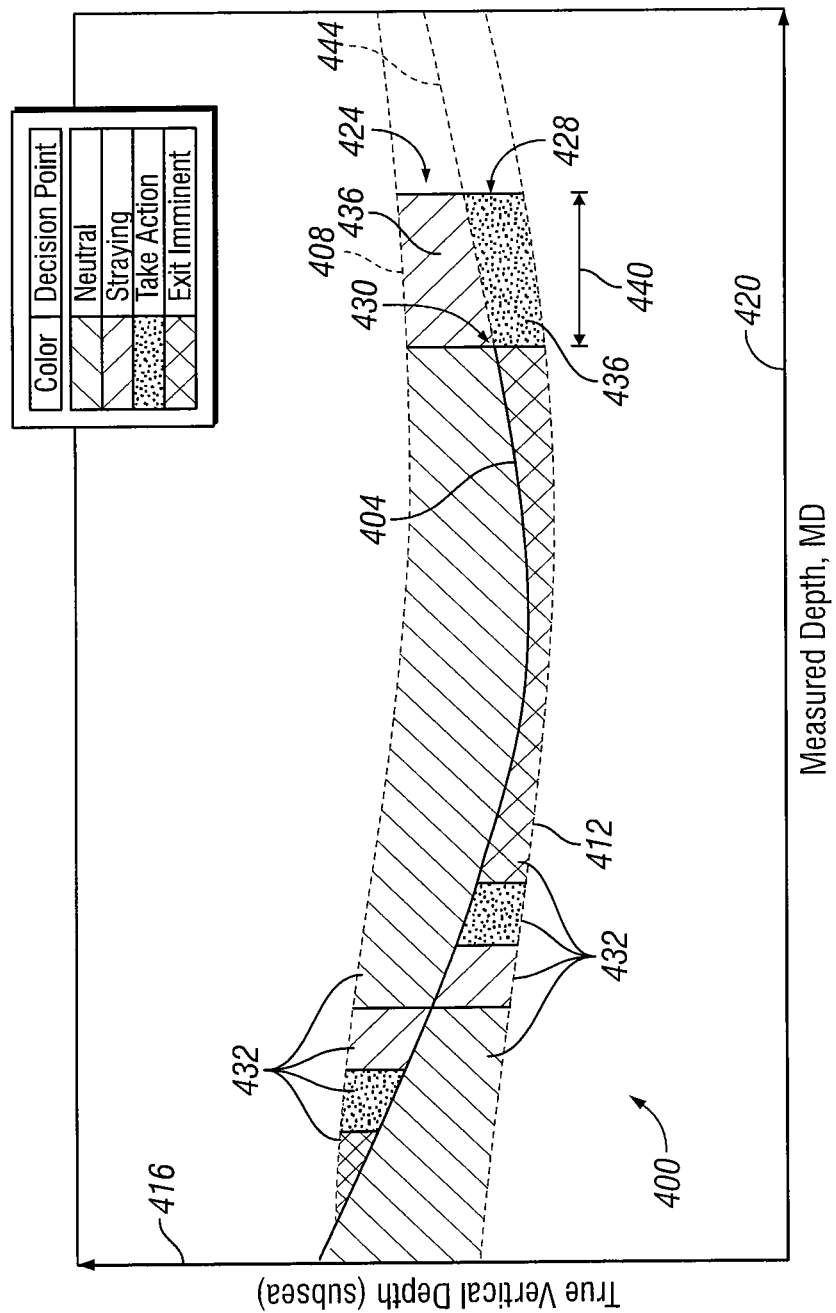
FIG. 4A-4B depicts respective example graphic displays or GUIs that may be generated by a system such as that depicted in FIG. 1, in accordance with respective example embodiments.
Figure 4B:
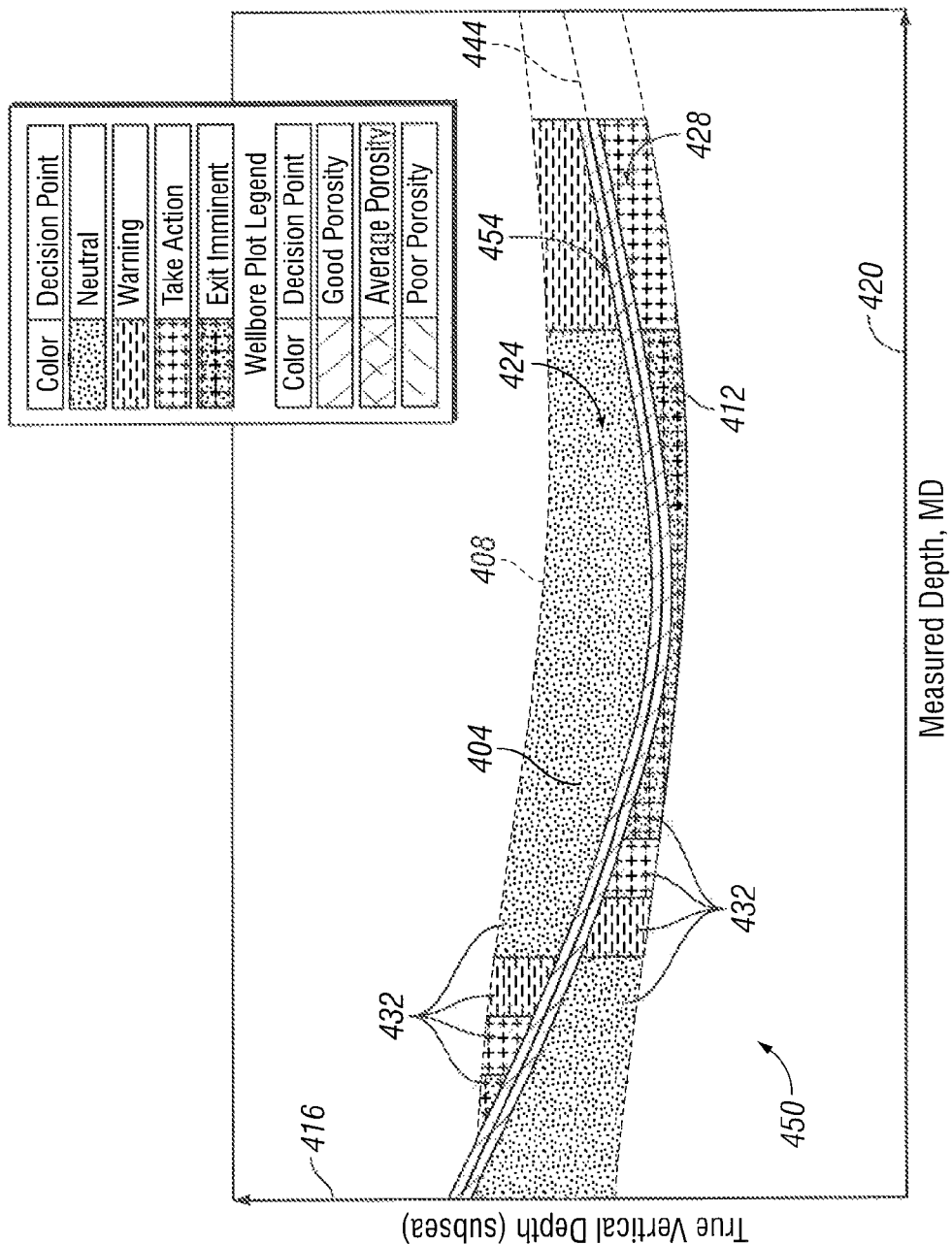

FIGS. 4A and 4B show respective example graphic displays rendered by the display module 116. The decision plot 400 of FIG. 4A is based on a selection of exit ranges similar but not identical to those discussed with reference to FIG. 3. A major difference between the example displays of FIG. 4A and FIG. 4B is that FIG. 4A shows an exit risk indicator only, while FIG. 4B provides a simultaneous display of both an exit risk indicator and a formation property indicator.

in FIG. 4A, reference numeral 400 generally indicates a graphic display or decision plot according to an example embodiment. The decision plot 400 is a two-dimensional display of a well bore trajectory 404 in relation to an upper formation boundary or reservoir boundary 408 and a lower formation boundary or reservoir boundary 412, plotted against true vertical depth on the y-axis 416 and measured depth on the x-axis 420. Bearing in mind that the decision plot 400 is a two-dimensional representation, the layered boundaries 408, 412 are represented in the decision plot 400 as respective lines. In other embodiments, a graphic display may be represented three-dimensionally, in which case the boundaries 408, 412 may be shown as shaped surfaces. In yet further embodiments, color-coded exit risk indicators may be applied to display types not limited to a geosteering decision plot, for example being applied to a plan view, a three-dimensional map, or an azimuthal plot. The particular shape and position of the boundaries 408, 412 may change during drilling of the well, depending on geology discovered while drilling. The example embodiment of FIG. 4A is with respect to a thick, homogeneous reservoir which has well defined boundaries 408, 412, but other embodiments may be with respect to more complex reservoirs which involve multiple layers and hence multiple boundaries that may be traversed throughout the length of a single well bore. In such a ease, the selection of boundaries with respect to which exit risk indicators are to be applied may change with a change in measured depth.

The decision plot 400 includes two color-coded exit risk indicators 424, 428 to indicate exit risks of the well bore trajectory 404 with relation to the respective reservoir boundaries 408, 412. An upper exit risk indicator 424 comprises a colored area extending between the well bore trajectory 404 and the upper boundary 408. The particular color of the upper exit risk indicator 424 at a leading end 430 of the well bore trajectory 404 (which corresponds to the drill bit 158 at the leading end of the drill string 154) provides a prominent visual indication of the corresponding range of exit values 312 (such as, for example, those shown in FIG. 3) within which a current exit risk value with respect to the upper boundary 408 falls. As the leading end 430 of the well bore trajectory 404 progresses further along the well path (i.e. moves further to the right in the decision plot 400 of FIG. 4A) the color of the upper exit risk indicator 424 may change in response to changing of the calculated exit risk value such that it falls in a different exit range. For example, the color of the upper exit risk indicator 424 at the well bore trajectory's leading end 430 in FIG. 4A is indicated with a first color, such as green, indicating a low risk of exiting the upper boundary 408. The user may thus be aware that there is more reservoir thickness above the drill bit 158 and may make the decision to drill upwards, to increase the wellbore interception with the productive zone. Further, movement along the well path may, however, heighten the risk of exiting the upper boundary 408 such that the color of the upper exit risk indicator 424 may change to another color, such as amber, indicating to the user to proceed with caution, and to at least consider adjustment of the borehole path. When the exit risk indicator 424 turns red, the user will know that the drill bit 158 should preferably be steered downwards, or some other adjustment considered.

The lower exit risk indicator 428 comprises an area extending between the well bore trajectory 404 and the tower boundary 412, and may function in a manner similar to that described above with respect to the upper exit risk indicator, with the difference that the lower exit risk indicator 428 indicates the risk of exiting the tower boundary 412. As noted earlier herein, in some embodiments, different algorithms may be used for calculating the exit risk values with relation to the respective formation boundaries 408, 412, depending, fur example, on the proximity of the well bore trajectory 404 to the respective boundaries 408, 412.

The exit risk indicators 424, 428 may comprise a series of differently colored sub-areas 436 extending along the well bore trajectory 404, indicating respective historical exit risk values. In such a case, the exit risk indicator 424, 428 therefore indicates not only a current exit risk value, but also historical exit risk values. In other embodiments, each exit risk indicator 424, 428 may show only a current exit risk value, so that the entire area extending between the well bore trajectory 404 and, for example, the upper boundary 408 may have a monolithic or uniform color representative of the current exit risk value at or adjacent the leading end 430 of the drill string 154.

The exit risk indicators 424, 428 may also include at least one sub-area 436 in advance of the leading end 430 of drill string 154 to indicate predictive or future exit risks values. Arrow 440 in FIG. 4A indicates a distance for which exit risk value calculations are projected ahead of the leading end 430. The distance 440 may correspond to the user-selected project ahead distance selected by means of text box 316 (FIG. 3). Such predictive exit risk value calculations may comprise extrapolating the well bore trajectory 404 based on its current course, or, alternatively may include extrapolating the well bore trajectory 404 based on a pre-planned well path. The projected well path is shown in FIG. 4A as a dashed line, indicated by reference numeral 444. Exit risk value calculations are performed with respect to the projected well path 444 in a manner similar to those with respect to the well bore trajectory 404.

In FIG. 4B is depicted a graphic display 450 similar to the graphic display 400 of FIG. 4A, with the addition of a formation property indicator 454. The formation property indicator 454 comprises a colored zone in the form of a band or strip of uniform thickness or radius extending along the well bore trajectory 404. In the present example, the color of the formation property indicator 454 indicates the porosity of rock through which the well bore 150 is drilled. The formation property indicator 454 may again show not only a current porosity range, but also historic porosity ranges, so that the formation property indicator 454 may comprises a series of differently colored portions representing a record of rock porosity along the well bore trajectory 404. The result is a multi-risk analysis display which provides a quick-took analysis as to the well bore placement, and also to the success of the well so far in terms of making reservoir targets.

A decision plot 400, 450 such as those described above provides a simplified display for welt bore placement and enables a quick-look analysis of potential upcoming exits without having to interpret real-time data or images, inclinations or distance to bed boundaries. The methodology allows for preemptive well planning, with a resultant decrease in well path tortuosity. All members of the drilling team (geologists, geophysicists, drilling engineers, completion engineers, management of all levels, as well as service company directional traverse, and geosteering specialists) may be presented with the same decision plot, to ensure that all members are working with common information when making geosteering decisions. Facilitating quick exit risk analysis by provision of the decision plot 400, 450 may reduce rig time spent circulating while decision meetings are held, thus providing additional time for planning and implementing well bore adjustments. A resultant lower probability of exiting the desired formation or reservoir may improve production and may lower operational costs when running completions.

The decision plot 400, 450 may also provide relevant information for non-geosteering related personnel. Multi-risk decision plots with areas of high dogleg severity may, for example, highlight potential difficulties for completion engineers, to enable the adjustment of plans based on the actual well bore drilled, and rather than on "pre-well plans." In some embodiments, a decision plot may include color-coded indicators with respect to target objectives. These could, for example, be based on effective porosity calculations for a quick-look indication of how much reservoir has already been drilled. Survey management applications can also take advantage of the type of interpretive display described herein.

Figure 5:
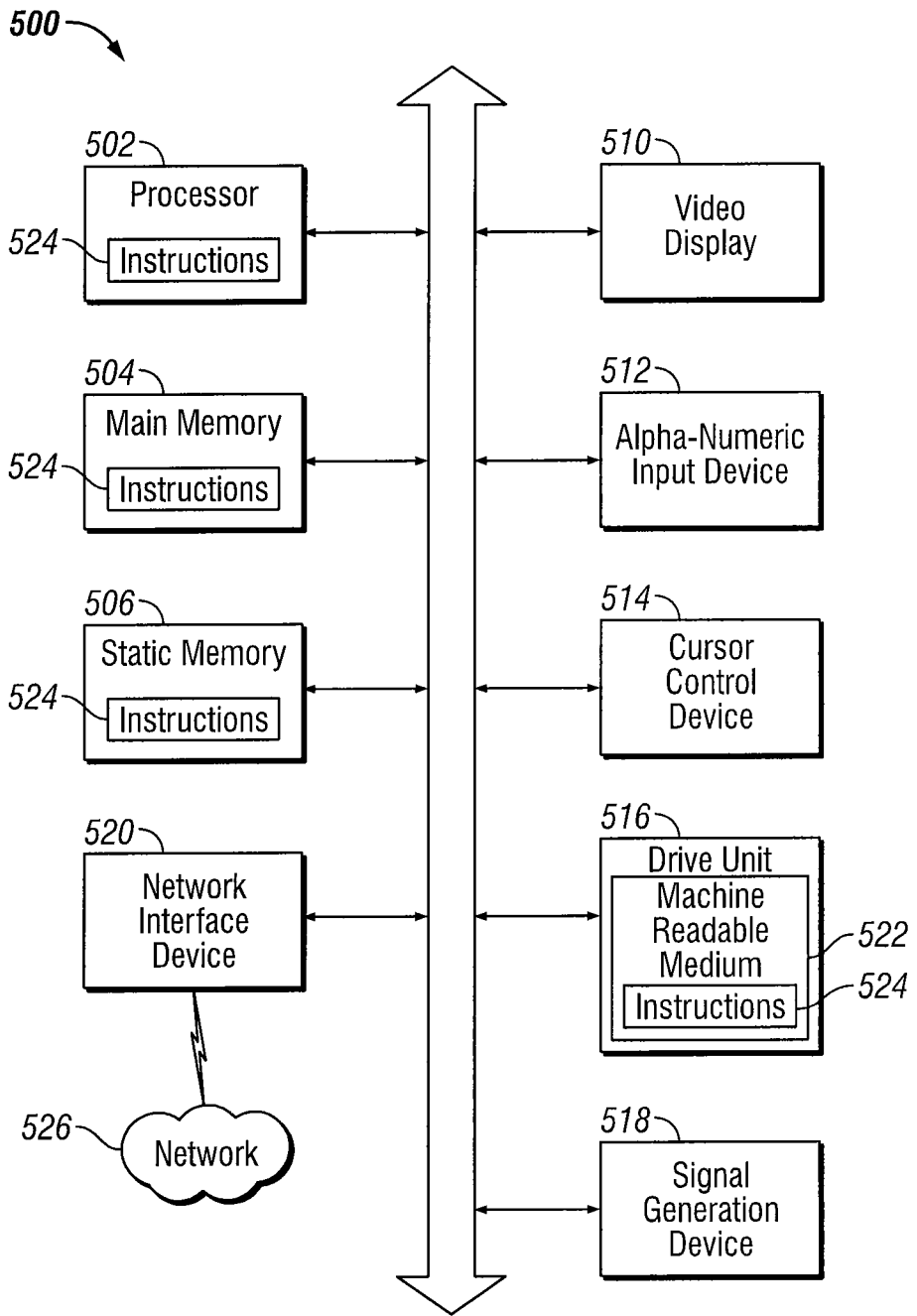
FIG. 5 is a block diagram of a machine in example form of a computer system within which a set of instructions for causing the machine to perform any one or more the methodologies discussed herein, may be executed.

FIG. 5 shows a diagrammatic representation of machine in the example form of a computer system 500 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU) a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a cursor control device 514 (e.g., a mouse), a disk drive unit 516, a signal generation device 518 (e.g., a speaker) and a network interface device 520.

The disk drive unit 516 includes a machine-readable medium 522 on which is stored one or more sets of instructions (e.g., software 524) embodying any one or more of the methodologies or functions described herein. The software 524 may also reside, completely or at least partially, within the main memory 504 and/or within the processor 502 during execution thereof by the computer system 500, the main memory 504 and the processor 502 also constituting machine-readable media.

The software 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any non-transitory medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical media, and magnetic media. Certain systems, apparatus or processes are described herein as being implemented in or through use of one or more "modules." A "module" as used herein is an apparatus configured to perform identified functionality through software, firmware, hardware, or any combination thereof. When the functionality of a module is performed in any part through software or firmware, the module includes at least one machine readable medium bearing instructions that when executed by one or more processors, perform that portion of the functionality implemented in software or firmware. The modules may be regarded as being communicatively coupled to one another to at least the degree needed to implement the described functionalities.

Thus, a method and system to perform analysis of a process supported by a process system have been described. Although the present invention has been described with reference to specific example embodiments, it will be evident that various modifications and changes may be made to these embodiments without departing from the broader spirit and scope of method and/or system. Accordingly, the specification and drawings are to be regarded in an illustrative rather than a restrictive sense.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
   a receiver to receive measurement data from downhole instrumentation forming part of a drill string during the drilling of a well bore in a geological formation;
   an exit risk determining module comprising one or more processors, to determine an exit risk value based at least in part on the measurement data, the exit risk value being indicative of a risk of exiting of the formation by the drill string; and
   a display module to render on a display device a graphic display of decision information to assist steering of the drill string, the graphic display including a color-coded exit risk indicator comprising a colored area having a color indicative of the exit risk value, the graphic display to show a well bored trajectory in relation to a formation boundary, the color coded exit risk indicator comprising a portion of an area extending between the displayed well bore trajectory and the displayed formation boundary, the color of the colored area being changeable in response to changes in the exit risk value.

2. The system of claim 1, wherein the display module is to render the graphic display as a two-dimensional display that plots the well bore trajectory, on one axis against true vertical depth, and on a perpendicular axis against measured depth of the well bore.

3. The system of claim 1, wherein the colored area of the exit risk indicator is to comprise a plurality of sub-areas extending in series along the well bore trajectory and being indicative of historic exit risk values, the color of an associated sub-area of the exit risk indicator at a particular point along the well bore trajectory being indicative of an associated historic exit risk value at the particular point along the well bore trajectory.

4. The system of claim 1, wherein the graphic display is to show the well bore trajectory in relation to two transversely spaced formation boundaries between which the well bore trajectory is at least partially located, colored areas on opposite sides of the well bore trajectory being indicative of respective exit risk values with relation to the respective formation boundaries.

5. The system of claim 1, further comprising an extrapolation module to extrapolate the well bore trajectory beyond a current leading end of the drill string, the exit risk determining module being to determine the exit risk factor with respect to the extrapolated well bore trajectory, and the display module being to render the graphic display such that the color-coded risk indicator includes an area extending between the extrapolated well bore trajectory and the formation boundary.

6. The system of claim 1, wherein the exit risk determining module is to determine the exit risk value by an operation comprising calculating proximity of the drill string to a formation boundary.

7. The system of claim 1, wherein the exit risk determining module is to determine the exit risk value by an operation comprising calculating a distance to interception of the drill string with a formation boundary, based on a current drilling direction.

8. The system of claim 1, wherein the exit risk determining module is to determine the exit risk by an operation comprising calculating an angle of incidence between the drill string and a formation boundary.

9. The system of claim 1, further comprising a user input module to receive user input to select a plurality of ranges for the exit risk value and to select an associated color for each of the ranges.

10. The system of claim 1, further comprising a formation analyzer module to determine a formation property value based on the measured data, the formation property value being indicative of a particular property of the formation at a point of measurement along the well bore trajectory, the graphic display including a color-coded formation property indicator having a color indicative of the determined formation property value.

11. The system of claim 10, wherein the formation property indicator comprises a colored band extending along the well bore trajectory.

12. The system of claim 1, wherein the exit risk value is indicative of a quantitative risk of exiting of the formation by the drill string.

13. A method comprising:
    receiving measurement data from downhole instrumentation forming part of a drill string during the drilling of a well bore in a geological formation;
    determining an exit risk value based on the measurement data, the exit risk value being indicative of a risk of exiting of the formation by the drill string; and
    rendering a real-time graphic display of information to assist steering of the drill string, the graphic display including a color-coded exit risk indicator comprising a colored area having a color indicative of the exit risk value, the graphic display showing a well bore trajectory in relation to a formation boundary, the color-coded exit risk indicator comprising a portion of an area extending between the displayed well bore trajectory and the displayed formation boundary, the color of the colored area being changeable responsive changes in the exit risk value.

14. The method of claim 13, wherein the graphic display is a two-dimensional display that plots the well bore trajectory, plotted on one axis against true vertical depth, and plotted on a perpendicular axis against measured depth of the well bore.

15. The method of claim 13, wherein the colored area of the exit risk comprises a plurality of sub-areas extending in series along the well bore trajectory and being indicative of historic exit risk values, the color of an associated sub-area of the exit risk indicator at a particular point along the well bore trajectory being indicative of an associated historic exit risk value at the particular point.

16. The method of claim 13, wherein the graphic display shows the well bore trajectory in relation to two transversely spaced formation boundaries between which the well bore trajectory is at least partially located, colored areas on opposite sides of the well bore trajectory being indicative of respective exit risk values with relation to the respective formation boundaries.

17. The method of claim 13, further comprising:
    extrapolating the well bore trajectory beyond a current leading end of the drill string;
    determining the exit risk factor with respect to the extrapolated well bore trajectory; and
    rendering the graphic display such that the color-coded risk indicator includes an area extending between the extrapolated well bore trajectory and the formation boundary.

18. The method of claim 13, wherein determining the exit risk value comprises calculating proximity of the drill string to a formation boundary.

19. The method of claim 13, wherein determining the exit risk value comprises calculating a distance to interception between a formation boundary and the drill string, based on a current drilling direction.

20. The method of claim 13, wherein determining the exit risk value comprises calculating an angle of incidence between the drill string and a formation boundary.

21. The method of claim 13, further comprising receiving user input to select a plurality of ranges for the exit risk value and to select an associated color for each of the ranges.

22. The method of claim 13, further comprising determining a formation property value based on the measured data, the formation property value being indicative of a particular property of the formation at a point of measurement along the well bore trajectory, the graphic display including a color-coded formation property indicator having a color indicative of the determined formation property value.

23. The method of claim 22, wherein the formation property indicator comprises a colored band extending along the well bore trajectory.

24. The method of claim 13, wherein the exit risk value is indicative of a quantitative risk of exiting of the formation by the drill string.

25. A machine-readable storage medium storing instructions which, when performed by a machine, cause the machine to:
  receive measurement data from downhole instrumentation forming part of a drill string during the drilling of a well bore in a geological formation;
  determine an exit risk value based on the measurement data, the exit risk value being indicative of a risk of exiting of the formation by the drill string; and
  render a real-time graphic display of decision information to assist steering of the drill string, the graphic display including a color-coded exit risk indicator comprising a colored area having a color indicative of the exit risk value, the graphic display showing; a well bore trajectory in relation to a formation boundary, the color-coded exit risk indicator comprising; a portion of an area extending; between the displayed well bore trajectory and the displayed formation boundary, the color of the colored area being changeable responsive changes in the exit risk value.

26. A system comprising:
  means for receiving measurement data from downhole instrumentation forming part of a drill string during the drilling of a well bore in a geological formation;
  means for determining an exit risk value based on the measurement data, the exit risk value being indicative of a risk of exiting of the formation by the drill string; and
  means for rendering a real-time graphic display of decision information to assist user-operated steering of the drill string, the graphic display including a color-coded exit risk indicator comprising a colored area having a color indicative of the exit risk value, the graphic display showing a well bore trajectory in relation to a formation boundary, the color-coded exit risk indicator comprising a portion of an area extending between the displayed well bore trajectory and the displayed formation boundary, the color of the colored area being changeable responsive changes in the exit risk value.

* * * * *